United States Patent
Phadke et al.

(10) Patent No.: US 7,616,464 B2
(45) Date of Patent: Nov. 10, 2009

(54) REVERSE CURRENT CONTROL SYSTEM FOR A POWER CONVERTER

(75) Inventors: Vijay Phadke, Pasig (PH); James Sigamani, Quezon (PH)

(73) Assignee: Astec International Limited, Hong Kong (HK)

( * ) Notice: Subject to any disclaimer, the term of this patent is extended or adjusted under 35 U.S.C. 154(b) by 448 days.

(21) Appl. No.: 11/205,209

(22) Filed: Aug. 16, 2005

(65) Prior Publication Data

US 2007/0041221 A1 Feb. 22, 2007

(51) Int. Cl.
*H02M 7/757* (2006.01)
*H02M 5/42* (2006.01)
*G05F 1/00* (2006.01)

(52) U.S. Cl. ............................ 363/79; 363/84; 323/285

(58) Field of Classification Search ............. 363/24–28, 363/21.06, 21.14, 56.06–56.08, 95, 131, 363/134, 75, 76, 79, 80, 82, 84, 89, 90; 323/285
See application file for complete search history.

(56) References Cited

U.S. PATENT DOCUMENTS

| | | | |
|---|---|---|---|
| 6,014,322 A * | 1/2000 | Higashi et al. ................. | 363/65 |
| 6,101,104 A | 8/2000 | Eng | |
| 6,181,579 B1 * | 1/2001 | Nagai et al. ............... | 363/21.06 |
| 6,373,732 B1 | 4/2002 | Patel et al. | |
| 6,381,152 B1 * | 4/2002 | Takahashi et al. ......... | 363/21.06 |
| 6,385,056 B1 * | 5/2002 | Gucyski ....................... | 363/15 |
| 6,414,861 B1 | 7/2002 | Matsumoto et al. | |
| 6,492,794 B2 * | 12/2002 | Hwang ........................ | 323/285 |
| 6,594,163 B2 | 7/2003 | Tsai | |
| 6,618,274 B2 * | 9/2003 | Boylan et al. .................. | 363/17 |
| 6,671,143 B2 * | 12/2003 | Hwang .......................... | 361/18 |
| 6,841,977 B2 | 1/2005 | Huang et al. | |
| 7,167,384 B2 * | 1/2007 | Yasumura .................... | 363/127 |
| 7,224,590 B2 * | 5/2007 | Lin .......................... | 363/21.06 |
| 7,391,188 B2 * | 6/2008 | Jacobs et al. ................. | 323/235 |
| 7,432,614 B2 * | 10/2008 | Ma et al. ....................... | 307/31 |
| 2005/0024896 A1 | 2/2005 | Man-Ho | |

* cited by examiner

*Primary Examiner*—Jessica Han
*Assistant Examiner*—Emily Pham
(74) *Attorney, Agent, or Firm*—Harness, Dickey & Pierce, P.L.C.

(57) ABSTRACT

A reverse current control system for first power converter having a synchronous rectifier and an output inductance includes a reverse current module. The reverse current module monitors a first voltage that is based on an output voltage of the output inductance and a second voltage that is based on an input voltage of the output inductance. The reverse current module anticipates a reverse current condition based on the first and second voltages. When the reverse current condition exists, the reverse current module prevents current from flowing in reverse through the power converter.

20 Claims, 6 Drawing Sheets

REVERSE CURRENT CONTROL SYSTEM FOR A POWER CONVERTER

FIELD

The present teachings relate to switching power supplies and more particularly to preventing reverse current in a power converter that uses synchronous rectification.

BACKGROUND

Switching power converters typically convert a DC voltage into an AC voltage by operating switching elements and then reconvert the AC voltage back to a DC voltage with a rectifier and smoothing circuit. A control circuit may be used to control a duty cycle of the switching elements. Switching power converters allow for a variable output voltage by varying the duty cycle of the switching elements. The ratio of the output voltage and the input voltage is typically determined by the duty cycle of the switching elements.

Synchronous rectification has been developed to reduce rectification losses improving the efficiency of the rectifier. Synchronous rectification proves particularly useful in power converters requiring a low output voltage and a high output current. Synchronous rectification utilizes power Metal Oxide Semiconductor Field Effect Transistors (MOSFETs) to rectify the output voltage of a power transformer. The MOSFETs are synchronized to the duty cycle of the switching elements and perform more efficiently than diodes due to a MOSFET's low resistance path during conduction. There are several known techniques to control synchronous rectifiers in a manner to provide a very low resistance path during forward conduction and function as a diode during the blocking period.

The bidirectional current flowing capability of the MOSFETs may allow reverse current to flow into the power converter. Reverse current may occur when a voltage exceeding the output voltage of the power converter is imposed on the output of the converter. The excess voltage charges a capacitor typically at the output of the power converter. When the output voltage of the converter settles, the capacitor discharges. If the synchronous rectifiers are conducting, the current discharged from the capacitor may flow in a reverse direction into the power converter.

In a stand alone power converter, reverse current can occur during step unloading or during start-up. Step unloading occurs when a load that is driven by the converter is removed and may create a voltage overshoot on the output. The voltage overshoot may charge the output capacitor during a no-load condition and raise the output voltage without having a load to discharge it. The control loop circuit may reduce the duty cycle to compensate for the overshoot. Because the control loop is rather deliberate, reverse current may occur while the duty cycle is reduced. During start-up of a stand alone power converter, the control loop circuit gradually raises the output voltage of the power converter to a soft-start reference level. If the power converter is driving a light load, the power converter may miss some pulses from the control loop causing the rectifiers to conduct longer and increasing the risk of reverse current.

For two or more power converters connected in parallel and having OR'ing MOSFETs substitute for OR'ing diodes, the OR'ing MOSFETs act as a short circuit when turned on so that they appear as directly parallel power converters. In a first situation involving parallel power converters, the output voltages from each converter may be slightly different, creating a possible reverse current condition. In a second situation involving parallel power converters, a first power converter may be on while a second power converter is inserted in parallel, such as in a redundant system. If the first power converter has a slightly higher output voltage, it may drive the entire load driving the output of the second power converter toward zero. The control loop circuit may not react quickly enough to increase the output voltage of the second power converter to that of the first power converter, and the second power converter may start to sink the current as its output capacitor is charged to the voltage level of the first power converter. Even when the converter is switching, progressive reverse current may build the output inductor since the synchronous rectifiers are switching.

This situation leads to the reverse operation of the converter transferring energy from the secondary side to the primary side and into the bulk capacitor. Both synchronous rectifiers are turned on during the dead time and just before the start of the next active period one synchronous rectifier is turned off. The reverse current may flow from the output capacitor in to the synchronous rectifier through the output inductor during the dead time. At the end of the dead time, one of the synchronous rectifiers is turned off and the reverse current in the inductor is interrupted swinging the input end of the inductor positive. This may occur after the dead time or it can happen when the switching resumes if pulses are missed. This operation is similar to a boost converter but the direction is reversed and the output voltage is boosted and transferred to the primary side through the power transformer. This causes the bulk voltage to rise, which can ultimately lead to power converter failure. In addition, overvoltage protection circuits typically used for bulk overprotection are ineffective due to reverse conversion from the secondary side.

When the voltage applied to the output of the converter is greater than the output voltage, reverse current starts to build during the dead time. More specifically, reverse current may flow from the output of the power converter through the secondary windings and the synchronous rectifiers to ground. The reverse current through the secondary windings may not be equivalent, however no net flux is induced in the transformer due to the equal and opposite voltages across the secondary windings. At the end of the dead time, one of the synchronous rectifiers is turned off and thus a portion of the reverse current flowing through the output inductor is interrupted. As a result, the output voltage of the power converter swings up to boost operation. The resulting boosted voltage may be clamped to an input bulk capacitor potentially causing damage to the input bulk capacitor, which is undesirable.

It is desirable to prevent reverse current to improve the robustness of power converter design. Various techniques have been proposed to achieve this goal. However, most techniques either simply reduce the reverse current or prevent it by turning off the synchronous rectifiers at a light load. Turning synchronous rectifiers off at light loads may result in an additional power loss at lighter loads and compromises the advantage of the using synchronous rectification.

Other techniques for addressing reverse current utilize a circuit to sense a voltage drop across the synchronous rectifier. The drop across the synchronous rectifier is negative when the current through the switch is in the forward direction, zero when there is no current, and positive when it is in the reverse direction. The synchronous rectifier is turned off when the drop is near zero by comparing the drop against a fixed reference. Since the synchronous rectifier is off when the current becomes zero, reverse current can be prevented. However, in high current low voltage converters, using low resistance MOSFETs for synchronous rectification makes it difficult to sense the voltage drop, and the body diode conduction time cannot be controlled precisely. In addition, if the synchronous rectifier is turned off earlier than required, due to the difficulty in sensing the voltage drop, the excessive body diode conduction will result in a lower efficiency.

Another technique for addressing reverse current utilizes a circuit that turns off the synchronous rectifier when the forward current goes below a certain minimum level, for example 10% of the full load. Since the synchronous rectifier is already in an off condition before the current reaches zero, the reverse current can be prevented. However, at loads when the synchronous rectifiers are off, the losses will be higher resulting in a less efficient operation at light loads. In addition, the output inductor may become discontinuous at light loads degrading regulation and ripple.

Yet another technique for addressing reverse current utilizes a circuit that detects the presence of reverse current and suppresses the reverse current by controlling the duty cycle ratio of the control loop circuit. The reverse current is identified when a voltage across the drain-source terminals of the MOSFET remains near zero in spite of having received an OFF command at its gate terminal. A transistor operates under this condition controlling a second transistor in a manner that increases the duty ratio to suppress excessive build up of reverse current. However, the reverse current is only reduced, not prevented.

SUMMARY

A power converter including a primary side for receiving an input voltage and generating an intermediate voltage and a secondary side for receiving the intermediate voltage and generating an output voltage. The secondary side includes a synchronous rectifier and an inductor. A transformer couples the primary side to the secondary side. A reverse current protection circuit compares an input voltage that varies in accordance with the voltage input to the inductor and an output voltage that varies in accordance with the voltage output from the inductor. The reverse current protection circuit generates a reverse current protection signal when the output voltage is greater than the input voltage. The reverse current protection signal inhibits reverse current flow in the synchronous rectifier.

Further areas of applicability of the present teachings will become apparent from the description provided hereinafter. It should be understood that the description and specific examples are intended for purposes of illustration only and are not intended to limit the present teachings.

DRAWINGS

The drawings described herein are for illustration purposes only and are not intended to limit the scope of the present teachings in any way.

DETAILED DESCRIPTION

For purposes of clarity, similar reference numbers will be used in the drawings to identify similar elements. As used herein, the term module generally refers to, but shall not be limited to, any one or a combination of an application specific integrated circuit (ASIC), a digital, analog, or hybrid electronic circuit, a processor (shared, dedicated, or group) and memory that execute one or more software or firmware programs, a combinational logic circuit, and/or other suitable components that provide the described functionality. The various embodiments will be described in connection with a phase-shifted, zero voltage switched converter. The various embodiments are equally applicable to various other types of converters topologies, including, by way of non-limiting example, forward converters, buck converters, flyback converters, and various types of half bridge and full bridge converters.

Figure 1:
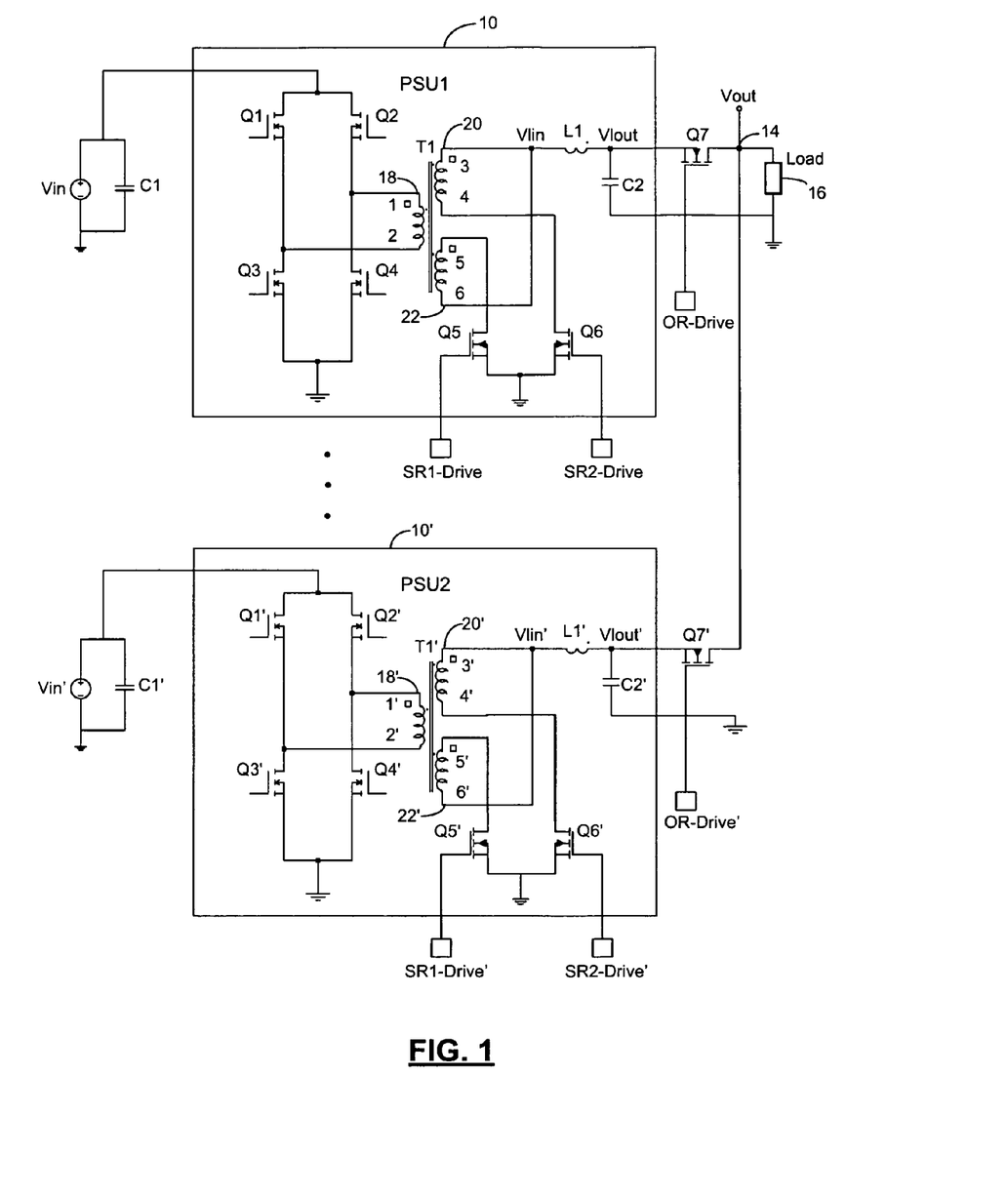
FIG. 1 depicts a pair of exemplary power converters connected in parallel.

Referring now to FIG. 1, a power converter 10 is connected in parallel to one or a plurality of power converters 10' at node 14 to drive a load 16. Power converters 10, 10' described herein are substantially the same and, thus, like reference numbers will refer to similar components. One skilled in the art will recognize that power converters 10, 10' need not be substantially similar. A transformer T1 has a primary winding 18 with terminals 1 and 2, a first secondary winding 20 with terminals 3 and 4, and a second secondary winding 22 with terminals 5 and 6. Terminal 3 of the first secondary winding 20 and terminal 5 of the second secondary winding 22 are electrically in phase as indicated by the phase dots.

On the primary side of transformer T1 an inverter implemented as full bridge supplies voltage to primary winding 18. More specifically, supply voltage Vin connects to terminal 2 through a switching transistor Q1. Vin connects to terminal 1 through a switching transistor Q2. A bulk capacitor C1 is arranged in parallel with Vin. Switching transistors Q3 and Q4 connect to terminals 2 and 1, respectively, and ground. Although a full bridge circuit is depicted in FIG. 1, one skilled in the art will recognize that any appropriate type of DC/AC conversion circuit or other inverter may be utilized on the primary side of transformer T1.

Transistors Q1, Q2, Q3, Q4 are controlled by a control loop circuit (not shown) in a manner such that an AC signal is generated at terminals 1 and 2. As is commonly known in the art, Q1 and Q4 are enabled for a period of time allowing current flow while Q2 and Q3 are disabled. After the period of time has passed, Q2 and Q3 are enabled for the same period of time allowing current to flow while Q1 and Q4 are disabled.

An intermediate voltage may be measured on the secondary side of transformer T1. Synchronous rectifiers Q5 and Q6 connect to terminals 5 and 4 of transformer T1, respectively, and ground. In various embodiments, Q5 and Q6 are implemented as n-channel Metal Oxide Semiconductor Field Effect Transistors (MOSFETs) having a drain, gate, and source and a body diode having an anode and a cathode, as is well known in the art. Synchronous rectifiers Q5, Q6 are switched on and off by respective control signals SR1-Drive, SR2-Drive applied to the respective gates. The control signal is generated by a controller (not shown). Although not shown, one skilled in the art would appreciate that the control signals may be applied to the gates via a buffer amplifier (not shown).

The output of the synchronous rectifiers Q5, Q6 is applied to a LC circuit that includes an output inductor L1 and a capacitor C2 connected at Vlout. OR'ing MOSFET Q7 connects to the LC circuit and enables the flow of current between the output inductor L1 and an output voltage node Vout. L1 connects to terminal 3 and a first terminal of Q7. C2 connects to the first terminal of Q7 and ground. A second terminal of Q7 connects to Vout. The gate terminal of Q7 receives a control signal to control the flow of current from node Vlout and Vout to supply energy to the load 16. OR'ing MOSFET Q7 is driven by a control signal OR-Drive provided by a controller (not shown) and may be applied to the gate of Q7 via a buffer amplifier (not shown). More specifically, if Q7 is enabled, current can flow bi-directionally through the low resistance path of Q7. If Q7 is disabled, current can only flow uni-directionally toward the load due to the body diode of Q7. Thus, when Q7 is disabled, current cannot flow in reverse into the power converter 10.

Figure 2:
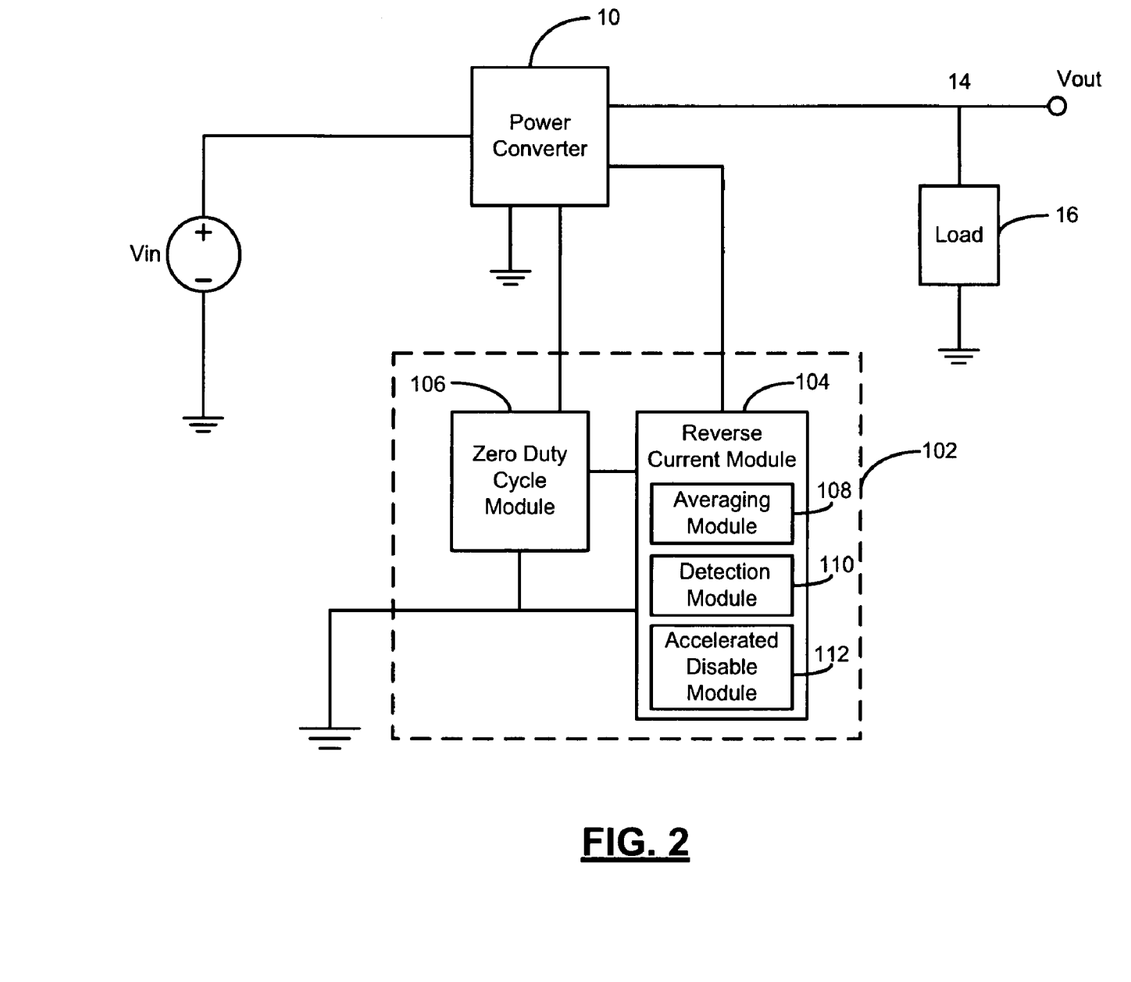
FIG. 2 is a block diagram of a power converter including a reverse current control system.

FIG. 2 depicts a block diagram of power converter 10 supplying the output voltage Vout to the load 16 and a reverse current control system 102. The power converter 10 converts Vin to a desired output voltage Vout to drive the load 16. Reverse current control system 102 connects to the power converter 10. Although shown only in association with power converter 10, one skilled in the art will appreciate that each power converter 10, 10' of FIG. 1 can be configured to include the reverse current control system 102. The reverse current control system 102 anticipates a reverse current condition. When a reverse current condition is anticipated, the reverse current control system 102 generates a reverse current inhibit signal. In one embodiment, the reverse current inhibit signal turns off synchronous rectifiers Q5 and Q6 to prevent the flow of reverse current through the power converter 10. Alternatively, the reverse current inhibit signal may turn off OR'ing MOSFET Q7 to prevent the flow of reverse current through the power converter 10. Generation of the reverse current inhibit signal is generally described hereinafter to disable synchronous rectifiers Q5 and Q6, but one skilled in the art will recognize that the reverse current inhibit signal could disable the OR'ing MOSFET Q7. By monitoring the input voltage Vlin of L1 and the output voltage Vlout of L1, a reverse current condition can be anticipated prior to the appearance of reverse current. Such anticipation relies upon the current through an inductor lagging the inductor voltage.

The reverse current control system 102 includes a reverse current module 104 and a zero duty cycle module 106. The reverse current module 104 monitors Vlin and Vlout. The reverse current condition is anticipated when Vlout is greater than an average of Vlin. In some embodiments, as will be described herein, the reverse current module 104 may indirectly monitor Vlin and Vlout to anticipate a reverse current condition. The anticipated reverse current condition exists when a voltage that varies in accordance with Vlout is greater than an average of a voltage that varies in accordance with Vlin. When the reverse current condition is anticipated, the reverse current inhibit signal is generated disabling synchronous rectifiers Q5, Q6 and preventing reverse current from flowing through the power converter 10.

In some embodiments, reverse current module 104 includes an averaging module 108, a detection module 110, and an accelerated disable module 112. The averaging module 108 calculates an average of Vlin. The detection module 110 anticipates the reverse current condition and the accelerated disable module 112 accelerates the generation of the reverse current inhibit signal. The reverse current control system 102 also includes the zero duty cycle module 106 that monitors the converter 10 at terminals 4 and 5 to detect pulses on the secondary side of transformer T1. The zero duty cycle module 106 generates a disable signal to prevent the reverse current module 104 from reenabling Q5 and Q6 when the control loop circuit disables switching of Q1, Q2, Q3, Q4 on the primary side of transformer T1.

Figure 3:
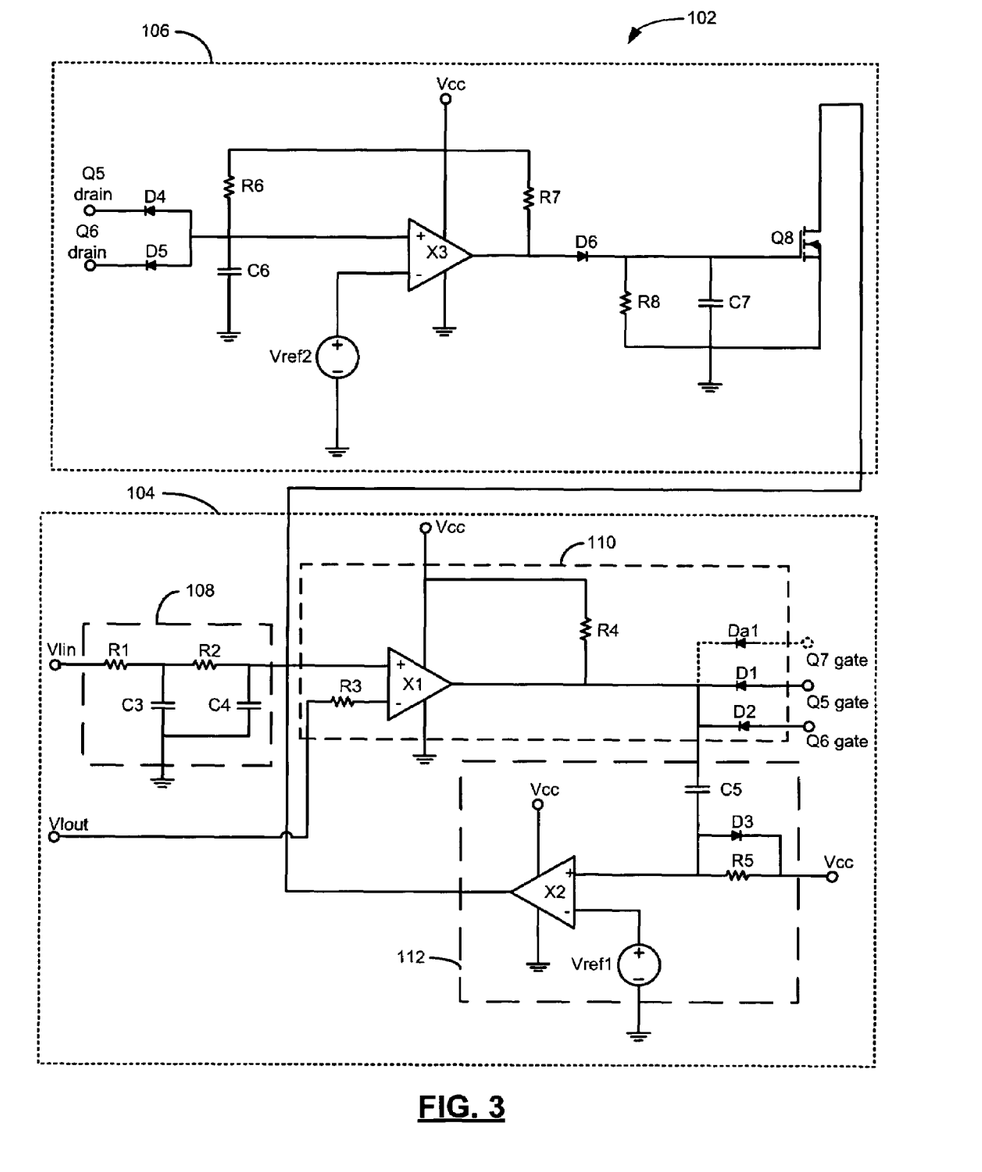
FIG. 3 is a circuit diagram of the reverse current control system according to various embodiments.

Referring now to FIG. 3, the reverse current module 104 includes the averaging module 108, the detection module 110, and the accelerated disable module 112. The averaging module 108 determines an average of Vlin using an averaging circuit including resistors R1 and R2 and capacitors C3 and C4. R1 connects to Vlin and R2. R2 connects to R1 and the detection module 110. C3 connects to R1, R2, and ground. C4 connects to detection module 110 and ground. R1, R2, C3, and C4 act collectively as a two pole filter that averages Vlin.

The detection module 110 includes a comparator X1 having positive, negative, and output terminals. X1 is powered by connection to Vcc and ground. The averaging module 108 connects to the positive terminal of comparator X1. A resistor R3 connects to the negative terminal of comparator X1 and Vlout. Comparator X1 is an open collector device and includes a pull-up resistor R4 between its output terminal and Vcc. When the positive terminal voltage exceeds the negative terminal voltage, the output terminal voltage is Vcc. Otherwise, the first output terminal voltage is zero (i.e., ground).

Diodes D1 and D2 each have an anode and a cathode. The cathodes connect to the output terminal of comparator X1. The anodes connect to respective gates of Q5 and Q6. When the average of Vlin exceeds Vlout, the output terminal voltage is high and prevents diodes D1 and D2 from conducting, enabling gate drive signals SR1-Drive, SR2-Drive to control respective synchronous rectifiers Q5, Q6. When the average of Vlin is less than Vlout, the output terminal of comparator X1 goes low, turning on D1 and D2 tying the gates of Q5 and Q6 to ground through D1 and D2, thereby providing the disable signal. Alternatively, a diode Da1 may be connected in a similar manner to control the OR'ing MOSFET Q7.

The accelerated disable module 112 includes a second comparator X2 having positive, negative, and output terminals and accelerates the transition of the output terminal of comparator X1 to a low voltage. X2 is powered by Vcc and ground. A voltage reference Vref1 connects to the negative terminal of comparator X2. A capacitor C5 connects to the positive terminal of comparator X2 and the output terminal of comparator X1 of the detection module 110. A resistor R5 connects to the positive terminal of comparator X2 and Vcc. A diode D3, having an anode and a cathode, connects to the positive terminal of comparator X2 and to Vcc. More specifically, the anode connects to the positive terminal of comparator X2 and the cathode connects to Vcc. The output terminal of comparator X2 connects to the positive terminal of X1 of detection module 110. Since R4 and R5 both connect to Vcc, the voltage on both sides of C5 is equal and thus capacitor C5 has a net charge of zero. When the output terminal voltage of comparator X1 is low, the voltage at the positive terminal of comparator X2 is pulled below the negative terminal voltage of comparator X2 via discharged C5. The output terminal voltage of comparator X2 also goes low and pulls the positive terminal voltage of comparator X1 lower than the negative terminal voltage of comparator X1. Since the positive terminal voltage of comparator X1 is zero (i.e., ground), the output voltage of comparator X1 will be low. Under this condition, the respective gates of Q5 and Q6 are pulled to ground through diodes D1 and D2 disabling Q5 and Q6. Thus, accelerated disable module 112 accelerates the reaction to an anticipated reverse current condition.

The output terminal voltage of comparator X1 of the detection module 110 remains low until C5 charges up to Vref1 through R5. After a time delay determined by C5 and R5, the voltage on C5 will exceed Vref1 and the voltage of the output terminal of comparator X2 will float. The time delay is preferably designed to be slightly longer than a response time of the control loop circuit to prevent Q5 and Q6 from toggling. After the time delay, the positive input of comparator X1 will become equal to the average of Vlin. If Vlout is less than the average of Vlin, the output terminal voltage of comparator X1 will become high enabling synchronous drive signals SR1-Drive and SR2-Drive to control MOSFETs Q5 and Q6.

The zero duty cycle module 106 includes a comparator X3 having positive, negative, and output terminals. X3 is powered by Vcc and ground. A resistor R6 connects to the positive terminal of comparator X3 and Vcc. A capacitor C6 connects to the positive terminal of comparator X3 and ground. Diodes D4 and D5 each have respective anodes and cathodes. The anodes connect to the positive terminal of comparator X3. The cathodes connect to Q5 and Q6 respectively. More specifically, the cathode of diode D4 connects to the drain of Q5 and the cathode of diode D5 connects to the drain of Q6. D4 and D5 prevent the zero duty cycle module 106 from drawing current from the power converter 10. A voltage source Vref2 connects to the negative terminal of comparator X3. A pull-up resistor R7 connects to Vcc and the output terminal. A diode D6 includes an anode that connects to the output terminal of X3. A cathode of D6 connects to a resister R8 that is connected to ground. A capacitor C7 connects to the cathode of D6 and ground. A transistor Q8 having a drain, gate, and source operates as a switch that generates a zero duty cycle signal when the zero duty cycle module 106 detects that the primary side switches Q1, Q2, Q3, Q4 are kept off by the control loop circuit, as will be described herein. The zero duty cycle signal simulates a low Vlin which draws the output terminal of the comparator X1 low. The drain connects to the positive terminal of comparator X1 of detection module 110, the gate connects to the cathode of D6, and the source connects to ground.

When Q5 and Q6 are disabled, the power converter 10 will rectify through the body diodes of Q5 and Q6. When the voltage drop of the body diodes is higher than the voltage drop of the synchronous MOSFET channels of Q5 and Q6, the average of Vlin will decrease making the voltage of the positive terminal of comparator X1 lower. When this happens, the voltage control loop circuit will sense that the output voltage is higher than its own regulation reference and will disable signals to primary side switching Q1, Q2, Q3, 04. When this occurs, L1 may act as a short circuit making Vlout and Vlin equal. When Vlout and Vlin are equal, the reverse current module 104 may enable synchronous rectification while the reverse current condition still exists. The zero duty cycle module 106 prevents this situation from occurring.

When the control loop circuit resumes controlling switches Q1, Q2, Q3, Q4, the zero duty cycle module 106 will sense the switching and will disable the reverse current inhibit signal (i.e., the output terminal of comparator X1 will go high) after a time delay provided by C7 and R8. The time delay enables the power converter to reach a stable operating condition after the reverse current control system 102 disables the reverse current inhibit signal.

Figure 4:
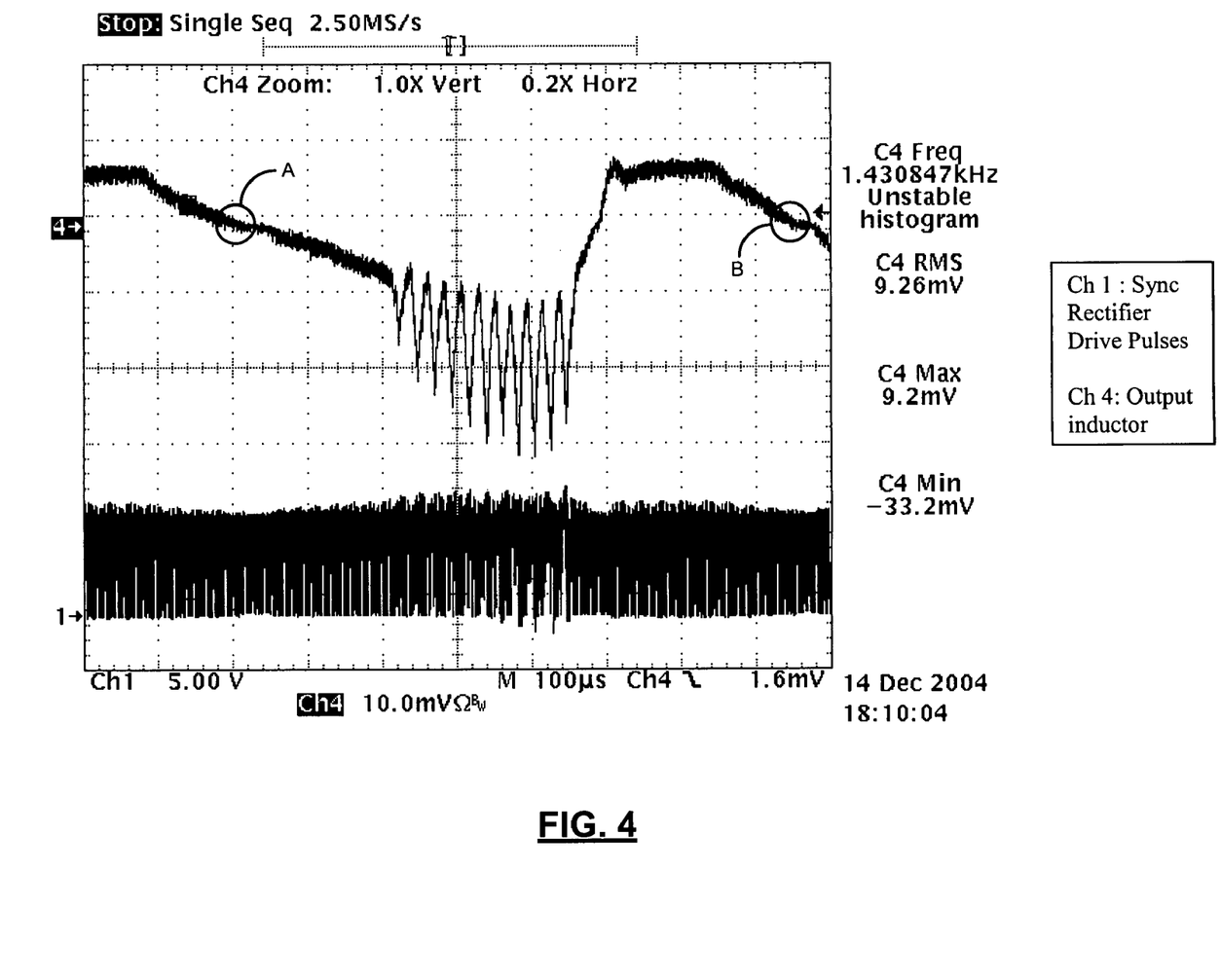
FIG. 4 depicts waveforms of an output inductor current and of a synchronous rectifier pulse during a reverse current condition for a conventionally arranged parallel power converter.

FIG. 4 depicts example waveforms for the current through inductor L1 and synchronous rectifier pulses for a power converter conventionally arranged (i.e., without reverse current protection) in parallel with a second power converter. The output voltages of the power converter and the second power converter differ by approximately 200 mV creating a scenario conducive to the reverse current condition. As shown, the output current of L1 is unstable and becomes negative indicating the reverse current condition at points A and B.

Figure 5:
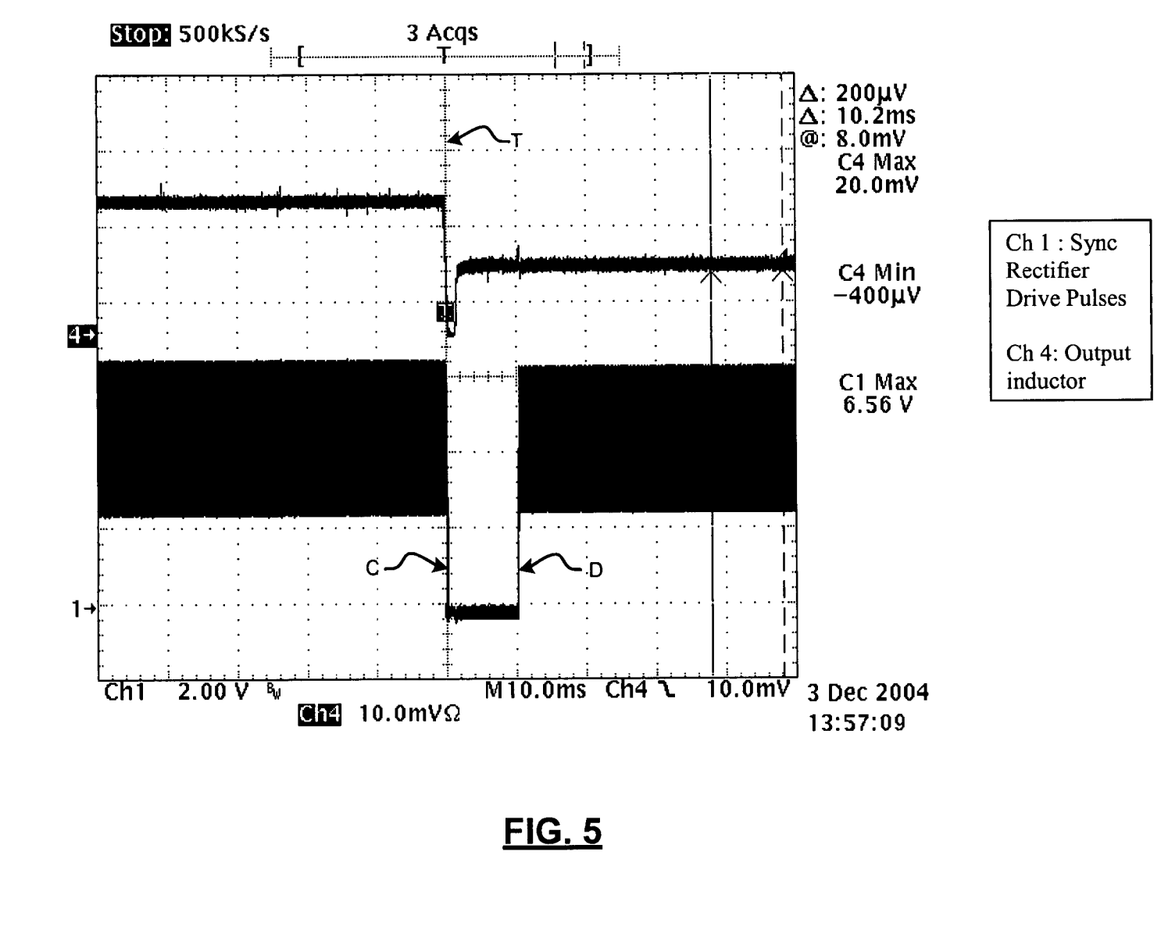
FIG. 5 depicts waveforms of an output inductor current and of a synchronous rectifier pulse for a parallel power converter having the reverse current control system described herein and responding to an anticipated reverse current condition.

FIG. 5 depicts example waveforms for the current through inductor L1 and synchronous rectifier pulses for a power converter having reverse current protection and arranged in parallel with a second power converter. The power converter having a lower voltage set point is first turned on, the other is then turned on to induce a possible reverse current condition. At time T the reverse current control system 102 anticipates a reverse current condition and disables the synchronous rectifiers at point C to prevent reverse current. After the time delay created by C7 and R8 has passed, the reverse current control system 102 enables the synchronous rectifiers at point D. As shown, the output current of L1 remains positive and drops by half due to the total load current being shared between the two power converters.

Figure 6:
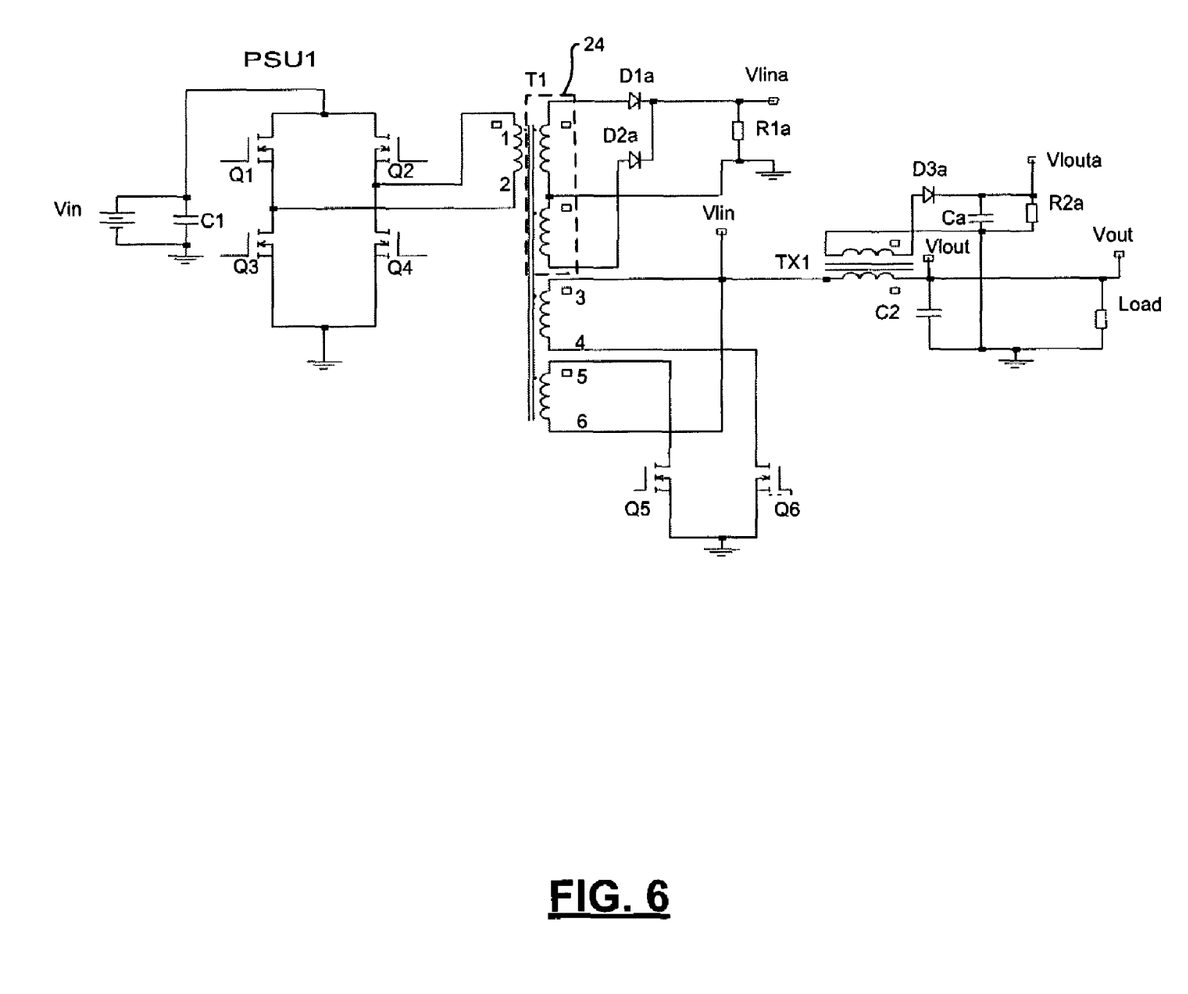
FIG. 6 is an alternate configuration of a power converter.

FIG. 6 depicts an alternate configuration of the power converter 10, 10'. The alternate configuration provides indirect monitoring Vlin and Vlout. The alternate configuration uses a tertiary winding 24 on the transformer T1 and an additional winding TX1 on the output inductor L1. Diodes D1a and D2a deliver rectified pulses from the tertiary winding 24 on the same transformer T1. Therefore, a voltage Vlina varies in accordance with Vlin. In addition, the additional winding TX1 placed on the output inductor generates a voltage Vouta through a diode D3a that varies in accordance to Vout. Thus, Vlina and Viouta may be monitored similarly as described above with respect to voltages Vlin and Vlout to determine when the reverse current condition is about to occur. The averaging module may connect to the alternate configuration of the power converter 10, 10'. More specifically, R1 may connect to Vlina and R3 may connect to Vlouta.

Those skilled in the art can now appreciate from the foregoing description that the broad teachings of the various embodiments can be implemented in a variety of forms. Therefore, while the various embodiments have been described in connection with particular examples thereof, the true scope of the teachings should not be so limited since other modifications will become apparent to the skilled practitioner upon a study of the drawings, specification, and the following claims.

What is claimed is:

1. A power converter system comprising:
an input circuit for receiving an input voltage and generating an intermediate voltage;
an output circuit for receiving the intermediate voltage and generating an output voltage;
an output inductance arranged at an output of the output circuit;
a reverse current module, the reverse current module monitoring a first voltage that varies in accordance with voltage output of the output inductance and monitoring a second voltage that varies in accordance with voltage input of the output inductance, the reverse current module determining an anticipated reverse current condition in accordance with the first and second voltages and generating a control signal to prevent current from flowing in a reverse direction in the output circuit in response to the anticipated reverse current condition; and
a synchronous rectifier in the output circuit, wherein the reverse current module disables activation of the synchronous rectifier upon anticipation of a reverse current condition
wherein the reverse current module determines the second voltage in accordance with an average of the voltage input of the output inductance and the reverse current module anticipates a reverse current condition when the first voltage is greater than the second voltage.

2. The power converter system of claim 1 further comprising:
   a parallel power converter; and
   a switching device inserted between the output inductance of the output circuit and a load arranged at an output of the power converter system, wherein the reverse current module disables activation of the switching device upon anticipation of a reverse current condition.

3. The power converter system of claim 1 further comprising a duty cycle module, the duty cycle module causing the reverse current module to generate the control signal when the input module has been disabled.

4. The power converter system of claim 1 further comprising a duty cycle module, the duty cycle module causing the reverse current module to generate the control signal when the input circuit has been disabled.

5. The power converter system of claim 1 wherein the reverse current module further comprises: an averaging module, the averaging module determining the average of the second voltage; a detection module, the detection module determining an anticipated reverse current condition in accordance with the average of the second voltage and the first voltage; and an accelerated disable module, the accelerated disable module communicating with the detection module and that accelerates the detection module reacting to anticipation of the reverse current condition.

6. The power converter system of claim 5 wherein the detection module further comprises:
   a comparator having a first input, second input, and output terminal, wherein the averaging module communicates a voltage signal to the first input terminal;
   a first resistance in communication with the second input terminal and the voltage output of the inductance;
   a second resistance in communication with a supply voltage and the output terminal; and
   a diode having an anode and a cathode, wherein the cathode communicates with the output terminal and the anode communicates with a switching device.

7. The power converter system of claim 5 wherein the acceleration module comprises:
   a comparator having a first input, second input, and output terminal, wherein the output terminal communicates with the detection module;
   a resistance in communication with the first input terminal and a supply voltage;
   a reference voltage in communication with the second input terminal;
   a diode having an anode and a cathode, wherein the anode communicates with the first input terminal and the cathode communicates with the first supply voltage; and
   a capacitance in communication with the detection module and the anode.

8. The power converter system of claim 5 wherein the averaging module comprises:
   a first capacitance in communication with the detection module and a supply voltage reference;
   a first resistance in communication with the detection module and a second capacitance that communicates with the supply voltage reference; and
   a second resistance in communication with the second voltage and the first resistance, wherein the second resistance is in communication with the second capacitance.

9. The power converter system of claim 5 wherein the duty cycle module comprises:
   a comparator having a first input, second input, and output terminal;
   a first resistance in communication with the first input terminal and a supply voltage;
   a first capacitance in communication with the first input terminal and a supply voltage reference;
   a reference voltage in communication with the second input terminal and the supply voltage reference;
   a second resistance in communication with the supply voltage and the output terminal;
   a second diode having an anode and a cathode, wherein the anode communicates with the output terminal and the cathode communicates with a third resistance that communicates with the supply voltage reference;
   a second capacitance in communication with the cathode and the supply voltage reference; and
   a switch having a first, second, and control terminal, wherein the first terminal communicates with the detection module, the second terminal communicates with the supply voltage reference, and the control terminal communicates with the second cathode.

10. A method to control reverse current in a power converter system, comprising:
    monitoring a first voltage that varies in accordance with voltage output of an output inductance at an output of an output circuit of a first power converter;
    monitoring a second voltage that varies in accordance with voltage input of the output inductance;
    determining whether a reverse current condition is anticipated based on the first and second voltage;
    inhibiting current from flowing in a reverse direction when the reverse current condition exists; and
    generating a disable signal to disable synchronous rectification in the first power converter in response to the anticipated reverse current condition,
    wherein the reverse current condition is anticipated when the first voltage is greater than an average of the second voltage.

11. The method of claim 10 further comprising providing a second power converter in parallel with the first power converter and switching a device, between the first power converter and a load, wherein current is prevented from flowing in reverse by opening the switching device when the first voltage is greater than the second voltage.

12. The method of claim 10 further comprising the step of accelerating the step of inhibiting current from flowing in a reverse direction.

13. A reverse current control system for a power converter having a switching device and an output inductance, comprising:
    a reverse current module, the reverse current module anticipating a reverse current condition when a first voltage based on a voltage output of the output inductance is greater than a second voltage based on a voltage input of the output inductance and disabling the switching device in response to the anticipated reverse current condition;
    an acceleration module that communicates with the reverse current module and that accelerates disabling the switching device by the reverse current module; and
    a duty cycle module that communicates with the reverse current module and that generates a disable signal when an input portion of the power converter is disabled.

14. A power converter comprising:
    a primary side for receiving an input voltage and generating an intermediate voltage;

a secondary side for receiving the intermediate voltage and generating a secondary side voltage, wherein the secondary side includes a synchronous rectifier and an inductor;

a transformer for coupling the primary side to the secondary side; and a reverse current protection circuit, the reverse current protection circuit comparing an input voltage that varies in accordance with the voltage input to the inductor and an output voltage that varies in accordance with the voltage output from the inductor, the reverse current protection circuit generating a reverse current protection signal when the output voltage is greater than the input voltage, the reverse current protection signal inhibiting reverse current flow in the synchronous rectifier, wherein the power converter is placed in parallel with a second power converter and wherein the input voltage is determined by taking an average of the voltage input to the inductor.

15. The power converter of claim 14 further comprising a output switch between the inductor and a load, the output switch enabling and disabling communication between the inductor and the load.

16. The power converter of claim 15 wherein the reverse current protection signal inhibits at least one of the synchronous rectifier and the output switch from conducting.

17. The power converter of claim 14 further comprising an output voltage circuit coupled to the inductor, the output voltage circuit indirectly sensing the output voltage from the inductor.

18. The power converter of claim 14 further comprising an input voltage circuit coupled to the transformer, the input voltage circuit indirectly sensing the input voltage to the inductor.

19. The power converter of claim 14 further comprising an output voltage circuit for indirectly sensing the output voltage from the inductor.

20. The power converter of claim 14 further comprising an input voltage circuit for indirectly sensing the input voltage to the inductor.

* * * * *

UNITED STATES PATENT AND TRADEMARK OFFICE
CERTIFICATE OF CORRECTION

PATENT NO. : 7,616,464 B2  Page 1 of 1
APPLICATION NO. : 11/205209
DATED : November 10, 2009
INVENTOR(S) : Phadke et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 816 days.

Signed and Sealed this

Nineteenth Day of October, 2010

David J. Kappos
*Director of the United States Patent and Trademark Office*

UNITED STATES PATENT AND TRADEMARK OFFICE
CERTIFICATE OF CORRECTION

PATENT NO. : 7,616,464 B2  Page 1 of 1
APPLICATION NO. : 11/205209
DATED : November 10, 2009
INVENTOR(S) : Vijay Phadke et al.

It is certified that error appears in the above-identified patent and that said Letters Patent is hereby corrected as shown below:

<u>Column 8,</u>
Line 27, "Viouta" should be --Vlouta--.

<u>Column 9,</u>
Line 14, claim 3, "input module" should be --input circuit--.

<u>Column 10,</u>
Line 21, claim 9, after "the", delete "second".

Signed and Sealed this
First Day of January, 2013

David J. Kappos
*Director of the United States Patent and Trademark Office*